Sept. 7, 1937.   F. E. HANSEN   2,092,116
HOSE COUPLING
Filed Nov. 7, 1935
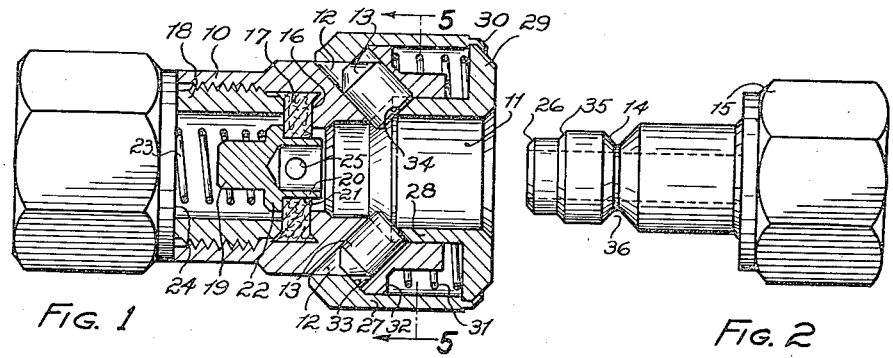
Fig. 1
Fig. 2
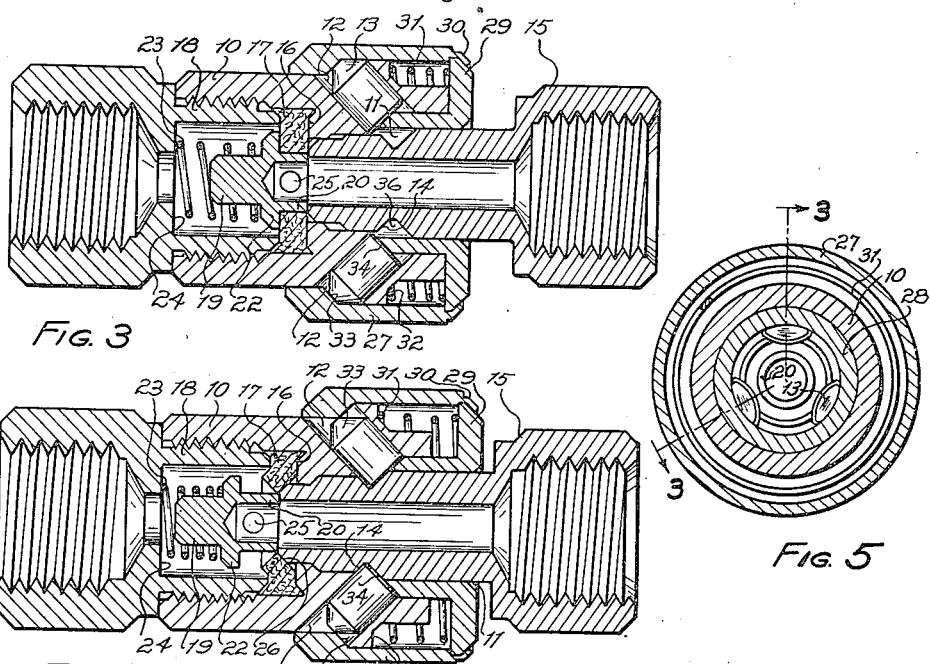
Fig. 3
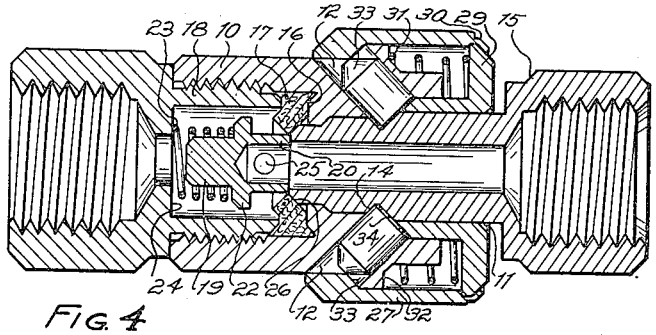
Fig. 5
Fig. 4
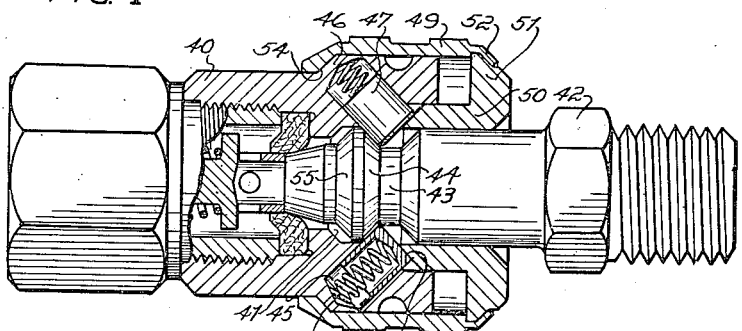
Fig. 6
INVENTOR.
FRED E. HANSEN
BY
Kwis, Hudson & Kent
ATTORNEYS.

Patented Sept. 7, 1937

2,092,116

UNITED STATES PATENT OFFICE 2,092,116

HOSE COUPLING

Fred E. Hansen, Lakewood, Ohio

Application November 7, 1935, Serial No. 48,711

6 Claims. (Cl. 284—19)

This invention relates to couplings for hose, pipes, and other articles requiring a coupling that is adapted for quick connection and disengagement.

It is one of the objects of the invention to provide a coupling, of the type referred to, comprising male and female members adapted to be securely coupled by merely forcing them together.

A further object of the invention is to provide a coupling of this type that may be readily and conveniently uncoupled.

A further object of the invention is to provide a coupling of the type referred to that will be so constructed that there is the minimum liability of the parts becoming accidentally uncoupled.

Other objects of the invention and the features of novelty will be apparent from the following description taken in connection with the accompanying drawing in which two preferred embodiments of my invention are illustrated. In the drawing, Fig. 1 is a composite view of the female member of a coupling, certain parts being shown in elevation and other parts in longitudinal section;

Fig. 2 is an elevation of the male member of the coupling in position to be connected to the female member;

Fig. 3 is a longitudinal section of the coupling as illustrated in Figs. 1 and 2 with the parts in partially coupled relation, the section being on the line 3—3 of Fig. 5;

Fig. 4 is a view similar to Fig. 3 but showing the parts in the fully coupled relation;

Fig. 5 is a transverse section on the line 5—5 of Fig. 1; and

Fig. 6 is a longitudinal section of another embodiment of my invention, this view being substantially similar to Fig. 4 but having certain parts shown in elevation.

Referring to the form of the invention illustrated in Figs. 1 to 5, 10 indicates the female member of the coupling which is provided with a bore 11 and a plurality of recesses 12, of which there are preferably three, inclined to the axis of the coupling and communicating with the bore 11. Arranged in each of the recesses 12 is a cylindrical locking member or pin 13 which is adapted to engage with the beveled shoulder 14 on the male member 15 for the purpose of maintaining the parts in coupled relation, as shown in Fig. 4.

The female member 10 is provided with an internal shoulder 16 against which there is clamped, in sealing engagement, a gasket 17, preferably of rubber, the gasket being secured in position by the fitting 18. A valve 19 has a tubular extension 20 projecting through the central hole 21 in the gasket 17, and a flange 22 adapted to make sealing engagement with one side of the gasket. A spring 23 is arranged between the wall 24 and the flange 22 in the fitting 18 so as to force the valve against the gasket 17 and thus prevent leakage of a pressure fluid past the valve. The extension 20 is provided with transverse ports 25, and when the valve is in its open position, as shown in Fig. 4, the pressure fluid may flow through these ports. The end 26 of the male member 15 is adapted to engage with the valve extension 20 to force the valve to its open position when the male member 15 is moved into coupling relation with the female member, as shown in Fig. 4.

Slidably arranged on the exterior of the female member 10 there is an outer sleeve 27 which carries an inner sleeve 28, the latter having a flange 29 which fits into the outer end of the sleeve 27 and is secured therein by spinning the metal of the outer sleeve down over the flange, as shown at 30. A spring 31 is arranged between the flange 29 and the shoulder 32 on the exterior of the female member and tends to move the sleeves 27 and 28 outwardly, as will be readily understood from the drawing.

The outer sleeve 27 has a beveled internal shoulder 33 which is adapted to engage with the tapered outer ends of the locking pins 13, as shown in Figs. 1 and 4, to hold these pins in their inner position and in engagement with the shoulder 14. The inner end of the sleeve 28 is beveled, as indicated at 34, and is adapted to engage with the inner ends of the pins 13 as shown in the drawing and thus acts as a retainer to hold the pins in their recesses 12 when the male and female members are separated as shown in Fig. 1. The shoulder 33 normally engages a complementary shoulder on the exterior of the female member 10, as shown in Fig. 1, to limit the outward movement of the sleeves 27 and 28 under the influence of the spring 31, so that the beveled end 34 of the inner sleeve 28 will in all its positions underlie the pins 13. The male member 15 has a beveled circumferential shoulder 35 which is adapted to engage with the inner ends of the pins 13 when the male member is forced into the female member of the coupling, thereby moving the pins 13 outwardly to the position shown in Fig. 3. The outward movement of the pins 13 moves the sleeves 27 and 28 to the left, in the drawing, against the tension of the spring 31, so that when the pins 13 reach the groove 16 on the male member, the spring 31 will cause the sleeves 27 and 28 to be moved toward the right, thereby forcing the pins inwardly into engagement with the circumferential shoulder 14, as shown in Fig. 4. The angle of the shoulder 14 is such that the axial pressure on the male member tending to uncouple the male and female members will impose a side thrust on the pins 13 that is normal to the axes and therefore there will be no tendency to move the pins outwardly.

When it is desired to uncouple the male and female members, the operator holds the sleeve 27 in one hand and the male member 15 or the part to which it is attached in the other hand, and by a pulling movement the inner sleeve 28 will be moved into the position shown in Fig. 2 and thus force the pins 13 out of engagement with the shoulder 14 and permit the male member to be withdrawn from the female member. When this occurs, the valve 19 will be automatically closed by the spring 23 and thus stop the flow of pressure fluid.

In the form of the invention illustrated in Fig. 6, the female member 40 has a bore 41 to receive the male member 42 and the latter has a circumferential groove 43 so shaped as to form the beveled circumferential shoulder 44. The female member 40 is provided with a plurality of recesses 45 which are inclined to the axis of the coupling and communicate with the bore 41 but, preferably, do not extend through the outer surface of the female member 40. In other words, the outer ends of the recesses 45 are closed by a wall which is indicated at 46. In each of the recesses 45 there is a cylindrical locking member or pin 47 which is cupped out to receive a compression spring 48. As will be obvious from Fig. 6, the springs 48 tend to force the pins 47 inwardly, and when the male and female members are in coupled relation, the springs 48 hold the pins 47 in engagement with the shoulder 44. An outer sleeve 49 is slidably arranged on the female member 40 and carries an inner sleeve 50, the latter having a flange 51 which is secured to the sleeve 49 by spinning over the metal as shown at 52. The inner end of the inner sleeve 50 is beveled as indicated at 53, and cooperating shoulders 54 on the exterior of the member 40 and the interior of the sleeve 49 limit the movement of the sleeves 49 and 50 toward the right so that the sleeve 50 will always underlie the pins 47 and retain them in the recesses 45.

The male member 42 has a beveled circumferential shoulder 55 which is adapted to engage the inner ends of the pins 47 and force them outwardly when the male member is moved into coupling relation with the female member.

When it is desired to uncouple the members, the operator holds the outer sleeve 49 in one hand and the male member 42 in the other and by a pulling movement causes the inner sleeve 50 to force the pins 47 outwardly so as to disengage them from the shoulder 44 and permit the male member 42 to be withdrawn. When it is desired to couple the male and female members, the former is inserted into the bore 41 and the engagement of the beveled shoulder 55 with the inner ends of the pins 47 will cause the latter to be forced outwardly and permit the male member to move to the position shown in Fig. 6 when the springs 48 will force the pins 47 inwardly into engagement with the shoulder 44 and thus retain the male and female members in coupled relation.

In the Fig. 6 construction, the valve for stopping the flow of the pressure fluid when the male and female members are disconnected may be the same as that previously described.

While I have illustrated and described what I now consider the preferred embodiments of my invention, and, while, because of its relatively low cost and convenience of operation, I prefer the Fig. 6 construction, it will be understood that various changes may be made in the details of the constructions which have been illustrated and described without departing from the spirit of the invention as defined in the appended claims.

Having thus described my invention, I claim:

1. In a coupling of the class described, the combination of a male member having a circumferential shoulder, a female member having a bore, to receive said male member, and a plurality of recesses communicating with said bore, locking members in said recesses and engageable with said shoulder to lock said male and female members in coupled relation, a sleeve slidable on said female member and carrying means projecting into the interior of said female member to engage said locking members and move them out of engagement with said shoulder and thereby permit the uncoupling of said male and female members, and spring means cooperating with said female member and said sleeve to move the latter to a position to retain said locking members in engagement with said shoulder.

2. In a coupling of the class described, the combination of a male member having a circumferential shoulder, a female member having a bore, to receive said male member, and a plurality of cylindrical recesses communicating with said bore, the axes of said recesses being inclined with respect to the axis of said bore, cylindrical locking members in said recesses and engageable with said shoulder to lock said male and female members in coupled relation, a sleeve slidable axially of said coupling and projecting into the interior of said female member to engage said locking members and move them out of engagement with said shoulder and thereby permit the uncoupling of said male and female members, and a separate coil spring in each of said recesses and cooperating with one of said locking members to move the same into engagement with said shoulder.

3. In a coupling of the class described, the combination of a male member having a beveled circumferential shoulder, a female member having a bore, to receive said male member, and a plurality of cylindrical recesses which are inclined with respect to the axis of the coupling, substantially cylindrical locking members in said recesses and engageable with said shoulder to lock said male and female members in coupled relation, a sleeve slidable in an annular space between said male and female members with its inner end adapted to engage said locking members and move them outwardly in said recesses and out of engagement with said shoulder to permit the uncoupling of said male and female members, and spring means acting to yieldingly hold said locking members in their locking position in said recesses.

4. In a coupling of the class described, the combination of a male member having a beveled circumferential shoulder, a female member having a bore, to receive said male member, and a plurality of cylindrical recesses which are inclined with respect to the axis of the coupling, hollow substantially cylindrical locking members in said recesses and engageable with said shoulder to lock said male and female members in coupled relation, a sleeve slidable in an annular space between said male and female members with its inner end adapted to engage said locking members and move them outwardly in said recesses and out of engagement with said shoulder to permit the uncoupling of said male and female members, and springs arranged in said recesses and extending into said locking members to yieldingly hold said locking members in their locking position in said recesses.

5. In a coupling of the class described, the combination of a male member having a beveled circumferential shoulder, a female member having a bore, to receive said male member, and a plurality of recesses which are inclined with respect to the axis of the coupling, substantially cylindrical locking members in said recesses and engageable with said shoulder to lock said male and female members in coupled relation, a sleeve slidable in an annular space between said male and female members with its inner end adapted to engage said locking members and move them outwardly in said recesses and out of engagement with said shoulder to permit the uncoupling of said male and female members, springs in said recesses acting to yieldingly hold said locking members in their locking position in said recesses, and said sleeve engaging and retaining said locking members in said recesses when said male member is removed from said female member.

6. A coupling of the class described, comprising the combination of a male member having a circumferential shoulder, a female member having a bore, to receive said male member, and a plurality of recesses communicating with said bore, locking members in said recesses and engageable with said shoulder to lock said male and female members in coupled relation, an outer sleeve slidable on the exterior of said female member and carrying an inner sleeve which projects into the bore in said female member so as to engage the inner ends of said locking members, said outer sleeve and the exterior of said female member having cooperating means for limiting the axial movement of the sleeves so that the inner sleeve will underlie said locking members in all of its positions and retain them in said recesses, said inner sleeve being adapted to force said locking members outwardly and disengage them from said shoulder by a movement into said bore, said male member having means for engaging said locking members and moving them outwardly when the male member is forced into the female member in coupling them together, and said outer sleeve having means to engage the outer ends of said locking members to retain the locking members in engagement with said shoulder.

FRED E. HANSEN.